J. A. KLEINFELDER.
STEAM COOKER.
APPLICATION FILED JUNE 26, 1908.

930,389.

Patented Aug. 10, 1909.
2 SHEETS—SHEET 1.

Witnesses
Jas. F. McCathran
H. J. Riley

Inventor
John A. Kleinfelder,
By E. G. Siggers
Attorney

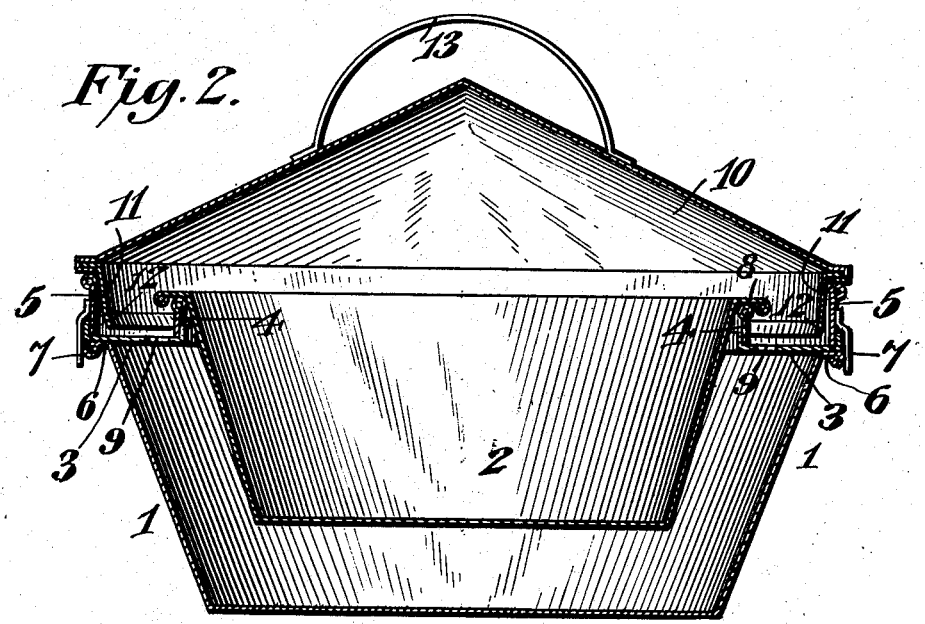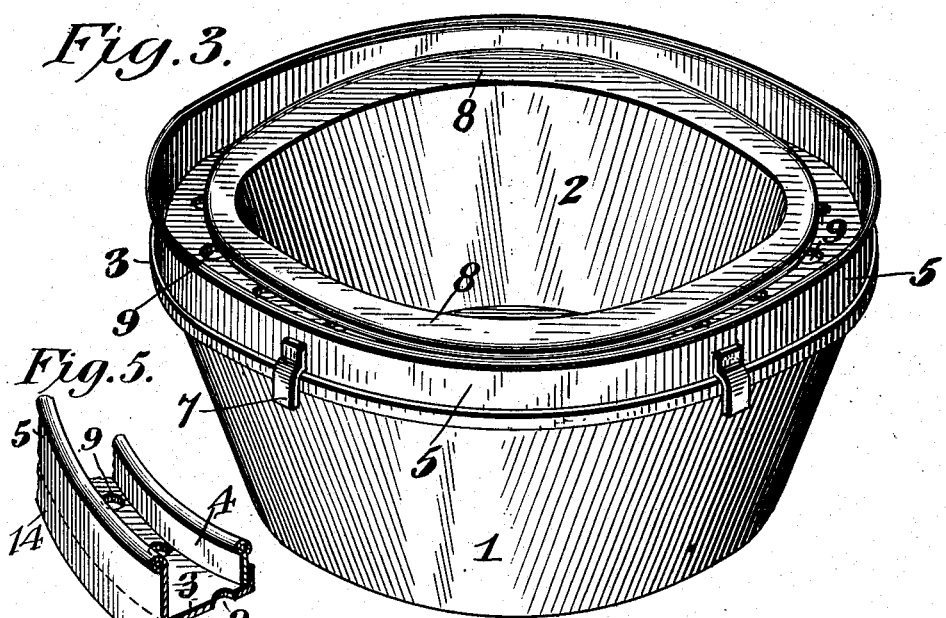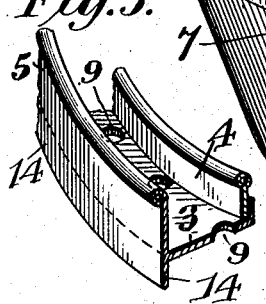

UNITED STATES PATENT OFFICE.

JOHN A. KLEINFELDER, OF MUSCATINE, IOWA.

STEAM-COOKER.

No. 930,389.   Specification of Letters Patent.   Patented Aug. 10, 1909.

Application filed June 26, 1908.   Serial No. 440,487.

*To all whom it may concern:*

Be it known that I, JOHN A. KLEINFELDER, a citizen of the United States, residing at Muscatine, in the county of Muscatine and State of Iowa, have invented a new and useful Steam-Cooker, of which the following is a specification.

The invention relates to improvements in steam cookers.

The object of the present invention is to improve the construction of steam cookers, and to provide a simple, inexpensive and efficient cooking utensil, designed to be constructed of various sizes for use in homes, hotels, restaurants, hospitals, etc., and adapted for cooking and steaming various articles of food, such as meats, vegetables, puddings, and the like, and capable of utilizing both the direct heat from the boiling water and the effect of the steam vapor rising therefrom whereby such articles of food may be rapidly steamed and cooked.

A further object of the invention is to provide a steam cooker of this character, adapted also for keeping the prepared food warm until it is desired to serve the same.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
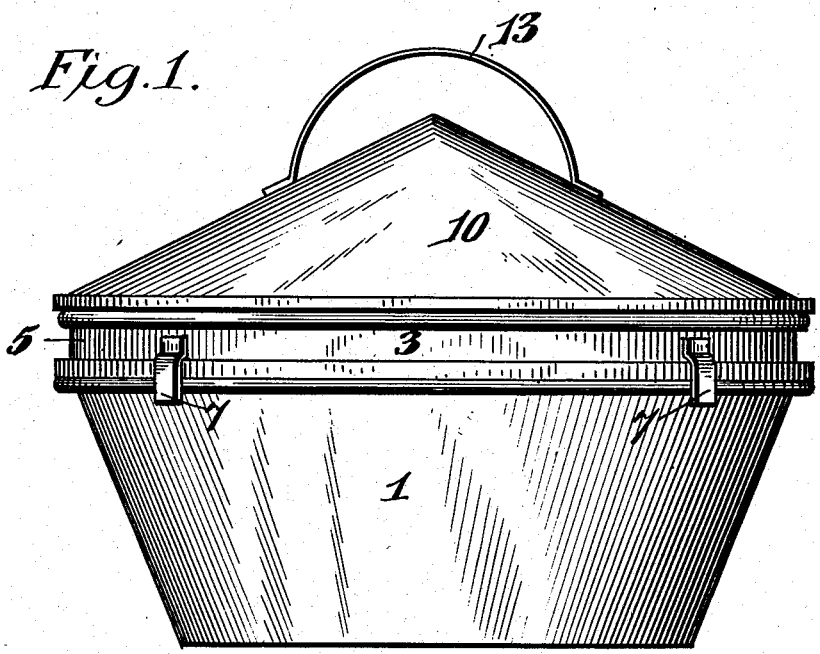
Figure 4:
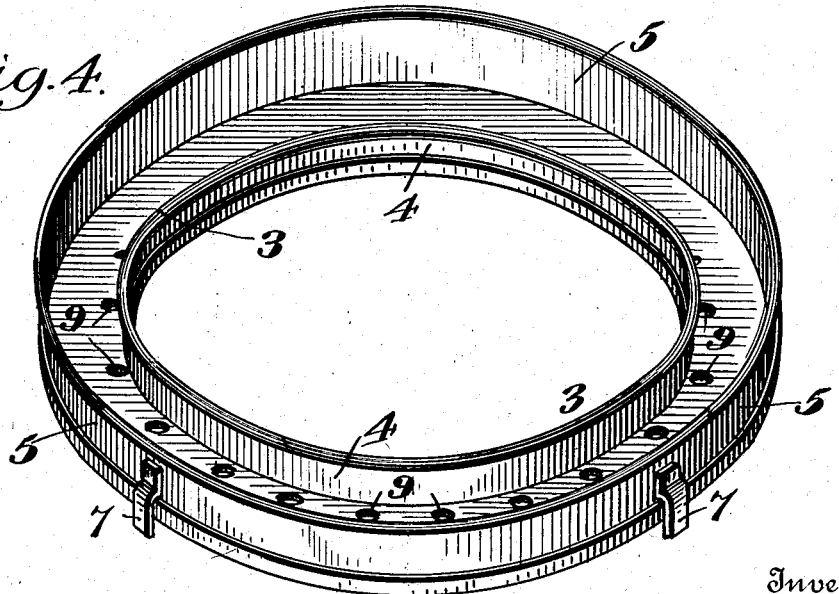

In the drawings:—Figure 1 is an elevation of a steam cooker, constructed in accordance with this invention. Fig. 2 is a vertical sectional view of the same. Fig. 3 is a perspective view of the steam cooker, the lid being removed. Fig. 4 is a perspective view of the supporting ring or member. Fig. 5 is a detail view, illustrating a modification of the invention.

Like numerals of reference designate corresponding parts in all the figures of the drawings.

1 designates an outer pan or receptacle, designed to contain a sufficient quantity of water to submerge the lower portion of an inner pan or receptacle 2, arranged in spaced relation with the bottom and sides of the outer pan or receptacle and supported in such position by a ring or member 3, arranged on the upper edges of the outer receptacle and receiving the inner receptacle.

The steam cooker is designed to be constructed in various sizes to adapt it for use in various places where food is prepared, and although I have shown the supporting ring or member circular and have termed the same a ring, yet it will be readily understood that the cooker may be of square, oblong, or elliptical form, if desired.

The supporting ring or member consists of a horizontal bottom or body portion, and inner and outer upwardly extending vertical flanges 4 and 5, arranged in parallelism and forming an intervening annular chamber or space, adapted to receive the condensed steam, as hereinafter more fully explained.

The outer receptacle is preferably provided at its outer edge with an outwardly extending horizontal flange 6, having a marginal bead and presenting a flat surface to the bottom of the ring, which is retained in place on the outer receptacle by means of depending lugs 7. The lugs 7, which may be of any preferred number, consist of short strips or pieces of sheet metal, secured at their upper ends to the exterior of the outer vertical flange of the ring and having lower outwardly bent depending portions for engaging the outwardly extending flange 6 at the outer edge thereof. The inner receptacle, which fits within the supporting ring or member, is also provided with an outwardly extending horizontal flange 8, having a marginal bead and resting upon the upper edge of the inner vertical flange 4, which is also preferably provided with a bead.

The inner pan receives the food to be prepared or kept warm, and the ring or supporting member is provided with an annular series of perforations 9, located adjacent to the inner vertical flange 4 and forming passages for permitting the steam to escape from the intervening space between the inner and outer receptacles and pass upward to steam the contents of the inner receptacle. As the lower portion of the inner receptacle is partially submerged in the boiling water, its contents are more quickly cooked than would be the case were inner pans supported above the surface of the water and the cooking performed solely by the steam. The steam passing upward through the perforations 9 of the supporting ring or member coöperates with the heat of the boiling water in cooking the food.

The outer vertical flange 5, which extends above the inner flange 4, supports a conical or dome-shaped lid or cover 10, resting at its outer edge or periphery upon the upper edge of the vertical flange 5, and provided with a depending annular flange 11 of less diameter than the lid or cover, extending downwardly and inwardly at an inclination into the annular space or chamber of the supporting ring to within a short distance of the bottom thereof, as clearly shown in Fig. 2 of the drawings. The lower edge 12 of the depending flange 11 is bent inwardly. The flange forms a shield and assists in preventing the escape of the steam at the periphery of the lid or cover and operates to conduct the water of condensation to the annular space or chamber of the supporting ring or member to cause such water to return to the outer receptacle. The lid or cover is equipped with a suitable handle 13 and enough water is placed within the outer receptacle to cook and steam the contents of the inner receptacle, so that it will not be necessary to add more water during such cooking operation.

The said depending lugs 7 are not an essential feature of the invention, as a continuous depending flange 14 may be employed, as illustrated in Fig. 5 of the drawings. The depending flange 14, which is arranged vertically, is designed to be formed integral with the upwardly extending vertical flange 5, and it is adapted to form a tight connection between the ring and the lower receptacle to more effectively prevent the escape of vapor or steam at this point.

Having thus fully described my invention, what I claim as new and desire to secure by Letters Patent, is:—

1. A cooking utensil of the class described comprising an outer receptacle, a supporting member including a flat bottom seated upon the upper edge of the outer receptacle and provided at an intermediate point between its inner and outer edges with openings forming passages for the steam, spaced inner and outer upwardly extending flanges, the outer flange being extended above the upper edge of the inner flange, and means located beyond the bottom of the supporting member and extending below the same for engaging the outer receptacle exteriorly thereof to retain the supporting member thereon, an inner receptacle seated upon the upper edge of the inner flange, and a cover arranged upon the upper edge of the outer flange.

2. A cooking utensil of the class described provided with a supporting member including a bottom arranged to rest upon the upper edge of a receptacle and provided with openings forming passages for the steam, inner and outer upwardly extending flanges, the outer flange being of a greater height than the inner flange to support a cover, and means located beyond and extending below the bottom of the supporting member and arranged to engage the outside of the receptacle on which the supporting member is placed to retain the supporting member thereon.

3. A cooking utensil of the class described including inner and outer receptacles, a supporting member arranged upon the upper edge of the outer receptacle and provided with inner and outer upwardly extending flanges and having openings located between the flanges, the inner flange forming a support for the inner receptacle, and a cover supported by the outer flange and provided with an inner depending flange extending downwardly and inwardly below the upper edge of the outer flange of the supporting member and into the space between the inner and outer flanges of the same to a point adjacent to the bottom of the said space, and forming a shield to prevent the escape of steam and to guide the condensed vapor back to the outer receptacle.

4. A cooking utensil of the class described including inner and outer receptacles, a supporting member arranged upon the upper edge of the outer receptacle and provided with inner and outer upwardly extending flanges and having openings located between the flanges, the inner flange forming a support for the inner receptacle, and a cover supported by the outer flange and provided with an inner depending flange extending downward into the space between the inner and outer flanges of the said member to a point adjacent to the bottom of the said space, said depending flange being inclined and having its lower edge bent inwardly.

5. A cooking utensil of the class described including a supporting member having a flat bottom and provided with inner and outer upwardly extending flanges, the outer flange being of greater height than the inner flange, said supporting member being provided with exterior depending lugs arranged at intervals to engage the outside of a receptacle to retain the supporting member thereon and having openings located between the said flanges and forming passages for the steam.

6. A cooking utensil of the class described including an outer receptacle, a supporting member having a flat bottom and fitted upon the outer receptacle and provided at intervals with depending exterior lugs for engaging the said outer receptacle, said member being also provided with inner and outer vertical flanges, the outer vertical flange being extended above the inner flange, an inner receptacle fitted within the said member and having an outwardly extending flange supported by the inner flange, and a cover arranged upon the said outer flange and provided with a depending flange extending into the space between the vertical flanges of the said member and forming a shield arranged to prevent the escape of steam and to direct the condensed vapor back to the outer receptacle.

7. A cooking utensil of the class described comprising an outer receptacle provided at its upper edge with an outwardly extending flange, a supporting member including a bottom seated upon the flange of the outer receptacle and having upwardly extending inner and outer walls, the outer wall being of a greater height than the inner wall, and means depending below the bottom of the supporting member and arranged to engage the outside of the outer receptacle to retain the supporting member thereon, an inner receptacle provided with an outwardly extending flange seated upon the inner flange of the supporting member and located at a point above the outwardly extending flange of the outer member, and a cover having an outwardly extending flange or portion arranged upon the upper edge of the outer flange of the supporting member, said cover being also provided with a depending flange extending downwardly and inwardly into the supporting member to prevent the escape of steam and to conduct the condensed vapor back to the outer receptacle.

In testimony, that I claim the foregoing as my own, I have hereto affixed my signature in the presence of two witnesses.

JOHN A. KLEINFELDER.

Witnesses:
  JOHN H. MUNROE,
  JOHN M. KEMBLE.